(12) United States Patent
Noack et al.

(10) Patent No.: US 9,882,228 B2
(45) Date of Patent: Jan. 30, 2018

(54) AIR-BREATHING FUEL CELL AND CELL STACK FOR THE OXIDATION OF IONS USING OXYGEN

(75) Inventors: Jens Noack, Pfinztal (DE); Thomas Berger, Pfinztal (DE); Jens Tuebke, Waldbronn (DE); Karsten Pinkwart, Pfinztal (DE)

(73) Assignee: FRAUNHOFER-GESELLSCHAFT ZUR FOERDERUNG DER ANGEWANDTEN FORSCHUNG E.V. (DE)

( * ) Notice: Subject to any disclaimer, the term of this patent is extended or adjusted under 35 U.S.C. 154(b) by 903 days.

(21) Appl. No.: 14/127,002

(22) PCT Filed: Jul. 13, 2012

(86) PCT No.: PCT/EP2012/063784
§ 371 (c)(1),
(2), (4) Date: Apr. 24, 2014

(87) PCT Pub. No.: WO2013/007817
PCT Pub. Date: Jan. 17, 2013

(65) Prior Publication Data
US 2014/0377681 A1    Dec. 25, 2014

(30) Foreign Application Priority Data
Jul. 13, 2011  (DE) .................. 10 2011 107 185

(51) Int. Cl.
*H01M 8/04* (2016.01)
*H01M 8/04186* (2016.01)
(Continued)

(52) U.S. Cl.
CPC ......... *H01M 8/04186* (2013.01); *H01M 4/92* (2013.01); *H01M 8/0234* (2013.01);
(Continued)

(58) Field of Classification Search
CPC .. H01M 8/04186; H01M 4/92; H01M 8/0234; H01M 8/0444; H01M 8/188; H01M 8/20
(Continued)

(56) References Cited

U.S. PATENT DOCUMENTS

| | | | |
|---|---|---|---|
| 4,048,384 A | 9/1977 | Chillier-Duchatel et al. | |
| 5,318,865 A * | 6/1994 | Kaneko | B60L 11/1868 429/345 |
| 2005/0202290 A1* | 9/2005 | Merzougui | H01M 4/242 429/9 |
| 2008/0274385 A1* | 11/2008 | Creeth | H01M 4/8652 429/492 |
| 2010/0330440 A1* | 12/2010 | Noh | H01M 8/04089 429/413 |

(Continued)

FOREIGN PATENT DOCUMENTS

| | | |
|---|---|---|
| DE | 69217725 | 7/1997 |
| WO | 9724774 A1 | 7/1997 |

(Continued)

OTHER PUBLICATIONS

English translation of the International Preliminary Report on Patentability issued in connection with PCT Application No. PCT/EP12/63784 dated Jan. 23, 2014.
(Continued)

*Primary Examiner* — Jonathan Jelsma
*Assistant Examiner* — Rashid Alam
(74) *Attorney, Agent, or Firm* — Gesmer Updegrove LLP

(57) ABSTRACT

The invention describes an air-breathing fuel cell for the oxidation of ions with air or oxygen, having an anode half cell and a cathode half cell. A first ion-conducting membrane and a second ion-conducting membrane is introduced between the half cells, and the second ion-conducting membrane is coated at least in regions on the side orientated towards the cathode half cell with a catalyst for the reduction of oxygen. According to the invention, the air-breathing fuel cell is characterised in that an oxidation zone for the oxidation of ions with negative standard electrode potential is provided between the ion-conducting membranes.

11 Claims, 4 Drawing Sheets

Figure 1:
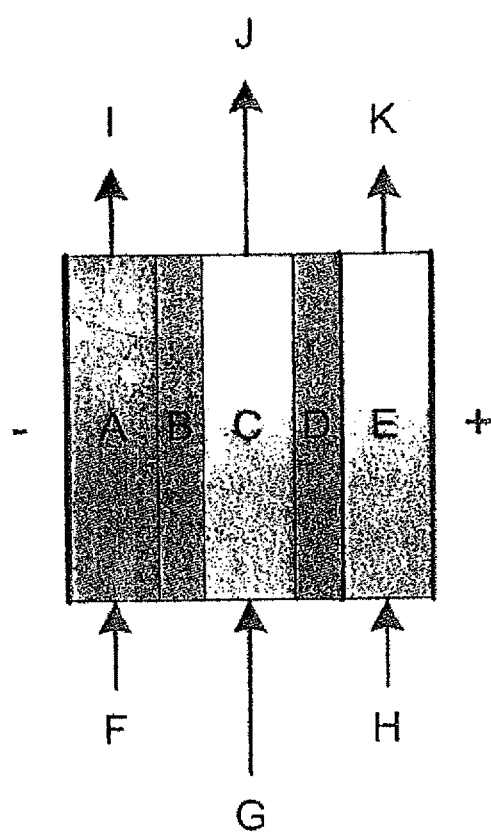

(51) Int. Cl.
*H01M 8/18* (2006.01)
*H01M 8/0444* (2016.01)
*H01M 8/20* (2006.01)
*H01M 4/92* (2006.01)
*H01M 8/0234* (2016.01)

(52) U.S. Cl.
CPC ......... *H01M 8/0444* (2013.01); *H01M 8/188* (2013.01); *H01M 8/20* (2013.01); *Y02E 60/528* (2013.01)

(58) Field of Classification Search
USPC .......................................................... 429/465
See application file for complete search history.

(56) References Cited

U.S. PATENT DOCUMENTS

2012/0178000 A1* 7/2012 Unlu .................. H01M 8/1023
429/401

FOREIGN PATENT DOCUMENTS

WO 2010094657 A1 2/2010
WO WO 2011038190 A1 * 3/2011 .......... H01M 8/1023

OTHER PUBLICATIONS

The International Search Report and Written Opinion issued in connection with PCT Application No. PCT/EP2012/063784 dated Oct. 5, 2012.

* cited by examiner

AIR-BREATHING FUEL CELL AND CELL STACK FOR THE OXIDATION OF IONS USING OXYGEN

PRIORITY INFORMATION

The present invention is a 371 National Phase Application of PCT/EP2012/063784, filed on Jul. 13, 2012 that claims priority to German Application No. 10 2011 107 185.0 filed on Jul. 13, 2011, which are incorporated herein by reference in their entireties.

BACKGROUND OF THE INVENTION

The invention describes an air-breathing fuel cell for the oxidation of ions with air or oxygen, having an anode half cell and a cathode half cell. A first ion-conducting membrane and a second ion-conducting membrane is introduced between the half cells, and the second ion-conducting membrane is coated at least in regions on the side orientated towards the cathode half cell with a catalyst for the reduction of oxygen. According to the invention, the air-breathing fuel cell is characterised in that an oxidation zone for the oxidation of ions with negative standard electrode potential is provided between the ion-conducting membranes.

A typical example of an air-breathing fuel cell from the state of the art is the vanadium/air fuel cell (DE 692 17 725 T2), termed here redox battery. In the case of this special embodiment, bivalent vanadium is oxidised to form trivalent vanadium at the anode, oxygen being reduced at the cathode and reacting with protons to form water.

The chemical reactions are the following:

Anode: $V^{2+} \rightarrow V^{3+} + e^-$  $E^0 = -0.255$ V

Cathode: $O_2 + 4H^+ + 4e^- \rightarrow 2H_2O$  $E^0 = +1.2$ V cathode is effected with the aid of a catalyst on a carbon electrode. The catalyst/carbon mixture is applied on the cathode side of the membrane (membrane electrode unit) and is in contact with a gas diffusion layer which consists of carbon and is in contact in turn with a carbon plate. The anode half cell consists of a carbon plate which is in contact with a porous carbon material. The porous carbon material serves for enlarging the surface and hence for increasing the power density. The porous carbon material, typically a graphite felt, is in contact with the membrane which has no catalyst coating on the anode side.

Furthermore, in this example from the state of the art, an acidic solution of bivalent vanadium ions is pumped through the anode half cell, whilst air is conducted through the cathode half cell. A terminal voltage is set between the carbon electrodes of the two half cells. If the circuit is completed, electrons flow from the anode via the consumer to the cathode.

The ion-conducting membrane is not 100% impermeable relative to the media so that the acidic solution of bivalent vanadium ions passes through the membrane to the applied catalyst layer. Because of the potential differences of the partial reactions, the following reaction thereby takes place on noble metal particles:

$V^{2+} V^{3+} + e^-$  $E^0 = -0.255$ V $2H^+ + 2e^- H_2$  $E^0 = \pm 0.0$ V $2V^{2+} + 2H^+ \rightarrow 2V^{3+} + H_2 \uparrow$ Because of the production of gaseous hydrogen in the catalyst layer, a change in the latter is effected by for example detachment of individual particles, which leads to the speed of the oxygen reduction reaction and hence the total power of the cell reducing rapidly. In addition, this effect is accelerated by current conduction through the cell and with accompanying electromigration of vanadium ions to the cathode.

SUMMARY OF THE INVENTION

This problem is resolved by the provision of the air-breathing fuel cell according to claim 1 and of the cell stack according to claim 10 and the use of the air-breathing fuel cell according to claim 11. Claims 2-9 describe advantageous embodiments of the air-breathing fuel cell.

In general, ions with a negative standard electrode potential must be prevented from being able to reach the catalyst layer. In the example of vanadium ions, bivalent vanadium ions must be prevented from being able to reach the noble metal catalyst layer. Trivalent vanadium ions do not evolve any hydrogen on platinum since the standard potential is positive.

This is achieved by the air-breathing fuel cell according to the invention for the oxidation of ions with air or oxygen, having an anode half cell and a cathode half cell, a first ion-conducting membrane and a second ion-conducting membrane being introduced between the half cells, and the second ion-conducting membrane being coated at least in regions on the side orientated towards the cathode half cell with a catalyst for the reduction of oxygen, characterised in that an oxidation zone for the oxidation of ions with negative standard electrode potential is provided between the ion-conducting membranes. The ion-conducting membrane can be designed as proton-conducting membrane. By means of the oxidation zone, ions with negative standard electrode potential are successfully prevented from being able to reach the catalyst layer.

In an advantageous embodiment, the air-breathing fuel cell is characterised in that ions are contained in the anode half cell, which are selected preferably from the group consisting of $V^{2+}$, $U^{3+}$, $Ti^{3+}$, $Ti^{2+}$, $In^{2+}$, $In^+$, $Cr^{2+}$, $Eu^{2+}$, $S_2O_6^{2-}$, $S_2O_4^{2-}$, $S_2O_3^-$, $H_2PO_2^-$, $HPO_3^{2-}$, $SO_3^{2-}$, $BH_4^-$, $Sn^{2+}$, $HSnO_2^-$, $AsO_2^-$, $SbO_2^-$.

The air-breathing fuel cell can comprise oxygen and/or air in the cathode half cell.

The oxidation zone of the air-breathing fuel cell can comprise a solution, preferably an acidic solution, a basic solution or a neutral salt solution, particularly preferred sulphuric acid and/or phosphoric acid or sodium hydroxide solution or potassium hydroxide solution and/or a salt solution of sodium chloride and/or potassium chloride.

The oxidation zone can comprise, according to the invention, a supply line and a discharge line (i.e. inlet opening and an outlet opening) which enables connection to a storage container. In addition, a pump in the circulation can ensure circulation.

With increasing operating time, ions (e.g. vanadium ions) from the anode half cell will accumulate in the oxidation zone and increase the concentration thereof The solution can be replaced by a solution without or with fewer ions at the latest just before reaching the solubility limit of the ions. A further possibility is continuous separation of ions from the solution in order to prevent precipitation of the ions in the solution. Detection of the type of ions and concentration of ions can be effected at any point, preferably within a circulation between oxidation zone and a storage container for an ion solution.

In an embodiment according to the invention, the oxidation zone comprises an oxidant, preferably oxygen and/or air. Since the ion-conducting membranes cannot completely prevent a diffusion of ions (e.g. $V^{2+}$ ions), the latter could pass from the anode half cell to the cathode half cell and hence to the catalyst. A suitable oxidant in the oxidation zone can oxidise the ions (e.g. $V^{2+}$ ions into $V^{3+}$ ions) and consequently prevent the reducing ions from reaching the catalyst of the cathode half cell. This can take place for example by scavenging with air oxygen as oxidant.

According to the invention, the oxidation zone can also comprise a porous auxiliary electrode which has a standard electrode potential which enables the oxidation of the ions.

In a preferred embodiment, the oxidation zone is connected to a detector via a supply line and discharge line and/or comprises a detector. The detector is hereby suitable for determining the type and concentration of reduction agent in the oxidation zone. By means of detection of the concentration and the type of ions, regulation of the supply of oxidant (e.g. air oxygen) can be effected. Detection of ions in the oxidation zone (e.g. $V^{2+}$ and $V^{3+}$) can be effected in the solution, for example by UV-VIS spectrometry or by measuring the potential between a reference electrode and a carbon electrode. In a particularly preferred embodiment, the detector is therefore a UV/VIS spectrometer and/or a voltage measuring device.

The anode half cell of the air-breathing fuel cell can comprise a carbon plate and a porous carbon material, preferably a graphite felt, the porous carbon material contacting the carbon plate and the first ion-conducting membrane.

The cathode half cell preferably comprises a carbon plate and a gas diffusion layer consisting of carbon, the gas diffusion layer consisting of carbon contacting the carbon plate and the second ion-conducting membrane.

The catalyst of the air-breathing fuel cell can be selected from the group of noble metals, in particular platinum, ruthenium, palladium and rhodium, and also the alloys thereof The ion solution of the anion half cell can be connected to a storage container by means of a supply line and a discharge line (i.e. an inlet opening and an outlet opening). For the circulation of ion solution, the circulation can comprise a pump.

In an embodiment according to the invention, the cathode half cell comprises a supply line and discharge line (i.e. an inlet opening and an outlet opening) for air or oxygen. Air or oxygen can hereby move into the cathode half cell from a source via a valve via the inlet opening. With an increase in operating time of the cell and with an increase in the concentration of ions in the oxidation zone, increasingly ions will reach the cathode half cell. As a result of water being produced, these are conducted into a separation tank with the air or oxygen flow via the outlet opening.

The air or the oxygen can be conducted furthermore from the separation tank into the storage tank for oxidant in order to regenerate consumed oxidant (oxidation by oxygen). Excess air/oxygen can emerge via a discharge air opening in the storage tank for oxidant.

The air-breathing fuel cell according to the invention can be combined to form a cell stack by means of stacking a plurality of individual cells. The cell stacks can hereby be connected in parallel or in series. The individual cells can be connected electrically such that the cell stack voltage is the sum of the individual cell voltages of the cells.

In the sense of the invention, the air-breathing fuel cell or the cell stack can be used as a battery.

The subject according to the invention is intended to be explained in more detail with reference to the subsequent Figures and examples without wishing to restrict said subject to the specific embodiments represented here.

DETAILED DESCRIPTION OF THE ILLUSTRATED EMBODIMENTS

FIG. 1 outlines the construction of an embodiment according to the invention of an air-breathing fuel cell.

Figure 2:
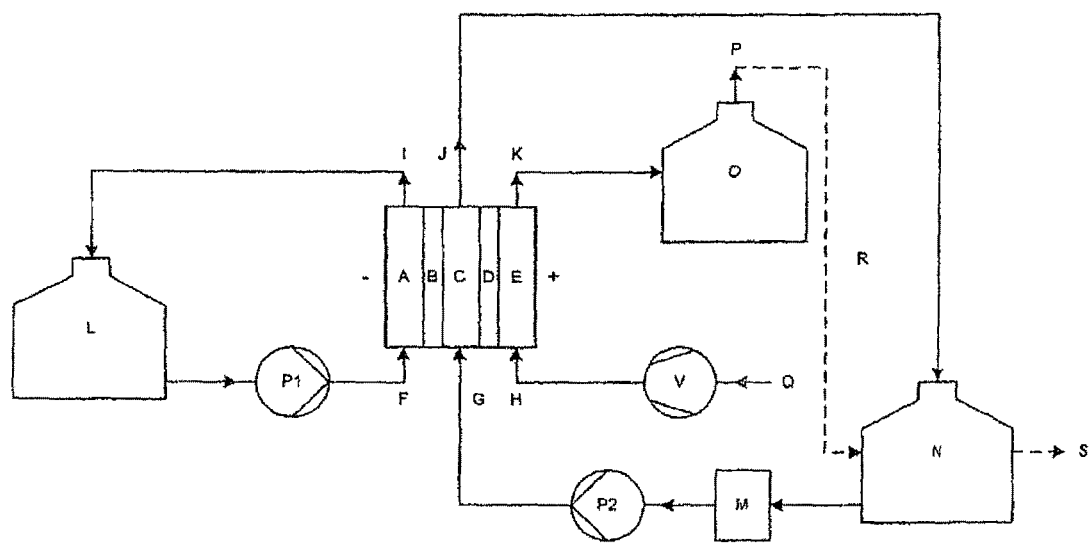

FIG. 2 outlines a preferred system for operation of a preferred design of the air-breathing fuel cell.

Figure 3:
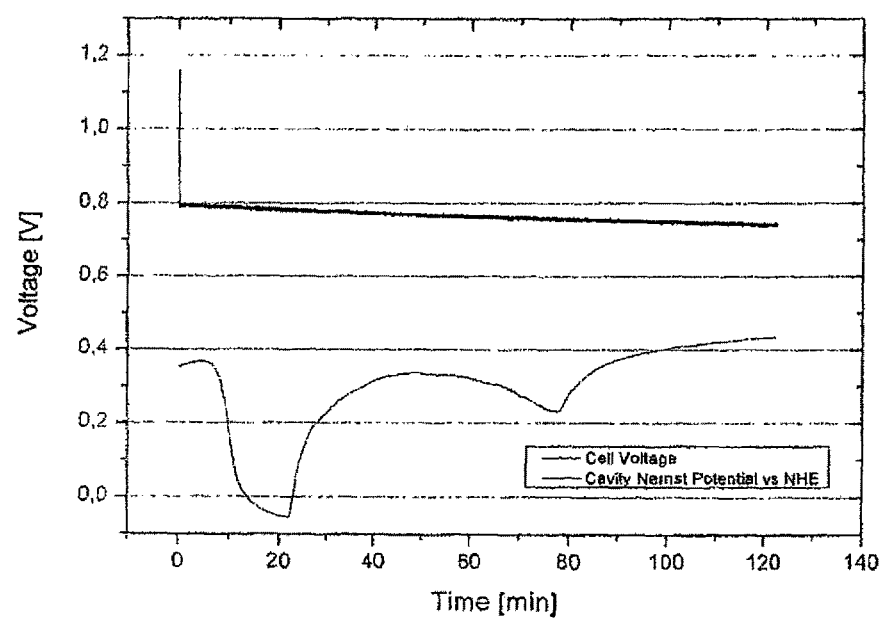

FIG. 3 illustrates the results of a discharge test of an air-breathing fuel cell according to the invention.

Figure 4:
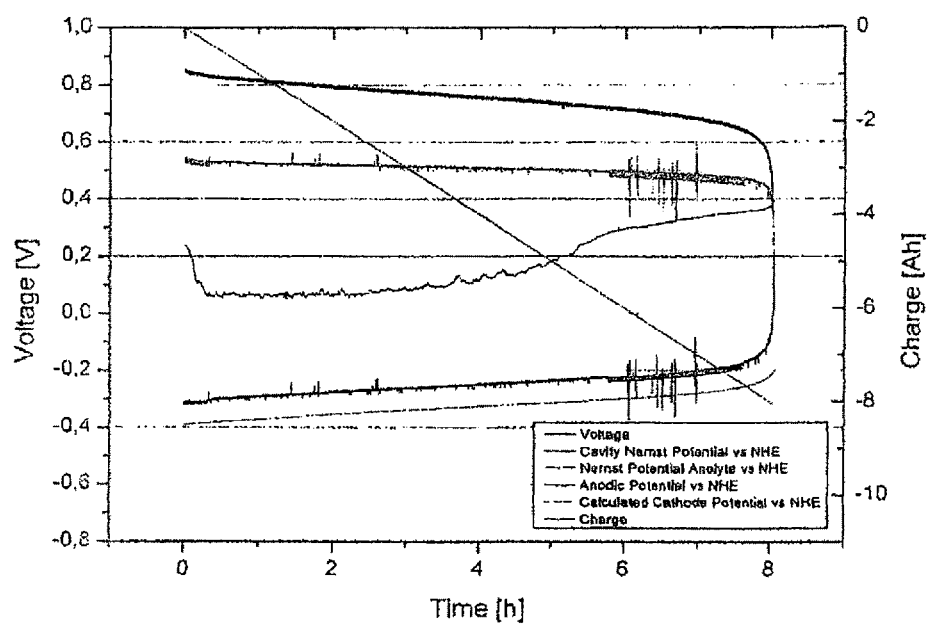

FIG. 4 summarises the result of the experimentally determined cell voltage and of the determined Nernst potential in the cavity of a fuel cell according to the invention.

FIG. 1 represents the construction of an air-breathing fuel cell according to the invention. The fuel cell comprises an anode half cell A and a cathode half cell E. A first ion-conducting membrane B and a second ion-conducting membrane D is introduced between the two half cells A, E. The first ion-conducting membrane B is disposed on the side of the anode half cell A orientated towards the cathode half cell E, whilst the second ion-conducting membrane D is disposed on the side of the cathode half cell E orientated towards the anode half cell A. On the cathode-side, the ion-conducting membrane D comprises a coating with catalyst for the reduction of oxygen. Between the ion-conducting membranes B, D, an oxidation zone C for the oxidation of ions with negative standard electrode potential is located. Furthermore, the anode half cell A comprises an inlet opening F and an outlet opening I for an ion solution, the cathode half cell E comprises an inlet opening H and an outlet opening K for air/oxygen and the oxidation zone C comprises an inlet opening G and an outlet opening J for an oxidising solution (e.g. an acidic or basic solution comprising air oxygen).

FIG. 2 describes a preferred system for operation of the air-breathing fuel cell according to the invention. The fuel cell is constructed as described in FIG. 1. During operation, the ion solution is pumped out of a storage tank for an ion solution L via the pump P1 through the inlet opening F into the anode half cell A and out of the outlet opening I back again into the storage tank L. From a storage tank for an acidic or basic solution N, the solution is pumped via the pump P2 through the measuring point M (e.g. a UV/VIS spectrometer) through the inlet opening G into the oxidation zone C and out of the outlet opening J back into the storage tank N. Via a source of air/oxygen Q, the air/the oxygen is conducted into the cathode half cell E through the valve V via the inlet opening H and conducted through the outlet opening K and into a tank O for separation of water/metal ions/air. The tank O comprises an outlet opening for air/oxygen through which air/oxygen can be guided optionally to the storage tank for the acidic or basic solution N in order to saturate the solution with air/oxygen. In this case, the storage tank N comprises a discharge air opening S which discharges excess air/oxygen and ensures the gas through-flow.

FIG. 3 describes the cell voltage and potentials of an air-breathing vanadium/oxygen fuel cell, having two membranes and an intermediate space. At the beginning of the measurement and hence of the current conduction, the cell voltage dropped from 1.35 V to 0.85 V. After 8 hours, the discharge closing voltage of 0 V was reached. The sampled capacity was approx. 8 Ah, which represented 93% of the theoretical value. The measured Nernst potential in the cavity at the beginning had a value of approx. +0.25 V, fell rapidly to a value of approx. 70 mV in order finally to rise again in the further course.

FIG. 4 describes the cell voltage and the Nernst potential in the cavity of an air-breathing vanadium/oxygen fuel cell with variation in the volume flow of air as oxidant for vanadium ions in the liquid circulation of the cavity C. The air scavenging of the cavity C was switched off approx. 7 minutes after discharge and only switched on again approx. 14 minutes later. After switching off the air scavenging, the potential drops extremely rapidly to 0 in order to rise again after being switched on again.

EXAMPLE 1

A cell with 51 cm$^2$ geometrically active membrane area was constructed according to the diagram in FIG. 1. The membrane electrode unit consisted of NAFION® 117 (DuPont, USA) with a single-side coating made of a mixture of platinum and carbon. The platinum loading corresponded to 2 mg/cm$^2$. The membrane between anode half cell and cavity was NAFION® 117 (DuPont, USA). A gas diffusion electrode (25 BC, SGL-Carbon, Germany) was situated between the coated side of the membrane electrode unit and a graphite composite plate (PPG 86, Eisenhuth, Germany) with throughflow channels. A graphite composite plate of the same type, without throughflow channels, was used as electrode in the anode half cell. A 5 mm thick graphite felt (GFA5, SGL-Carbon, Germany) was situated between graphite composite plate and membrane. The cavity between anode half cell and cathode half cell had a thickness of 30 mm and allowed placing respectively of one glass carbon electrode and one Hg/Hg$_2$SO$_4$ reference electrode. The two half cells and the cavity had supply and discharge lines for liquid media. The anode half cell was scavenged continuously with 200 ml of a solution of 1.6 M VSO$_4$ in 2 M H$_2$SO$_4$ and 0.05 M H$_3$PO$_4$ from a storage container. The theoretical capacity was 8.6 Ah. The cavity was scavenged continuously with an aqueous 2 M H$_2$SO$_4$ from a storage container. The sulphuric acid solution was scavenged with air in the storage container. With the help of a mass throughflow regulator, air with a volume flow of 60 ml/min was conducted through the cathode half cell into a storage container. The storage container served to collect any water which was produced. The discharge tests were effected with a potentiostat (Modulab, Solartron, USA) with subsequently connected amplifier (Boost 12V/20A, Solartron, USA) with a discharge current of 1 A. The sudden drop in the Nernst potential at the beginning of the measurement (see FIG. 3) can be explained by an intensified increase in bivalent vanadium ions in the cavity due to electromigration with current conduction. The increase in the concentration of bivalent vanadium was effected until equilibrium of the oxidation to form trivalent vanadium due to scavenging of the solution with air oxygen. The further increase in potential and hence the reduction in the concentration of bivalent vanadium was effected by the reduction in the concentration of bivalent vanadium in the anolyte.

EXAMPLE 2

In a further experiment, the air scavenging of the fuel cell produced according to example 1 was switched off after a discharge time of approx. 7 minutes. From this time, the potential dropped to a critical value of approx. −0.05 V. Resumption of the air scavenging allowed bivalent vanadium (V$^{2+}$) to oxidise and the potential to rise again (see FIG. 4). The test was repeated immediately thereafter, however the air supply was not switched off completely but rather the volume flow was reduced and finally increased again.

What is claimed is:

1. An air-breathing fuel cell for the oxidation of ions with air or oxygen, having an anode half cell and a cathode half cell, a first ion-conducting membrane and a second ion-conducting membrane being introduced between the half cells, and the second ion-conducting membrane being coated at least in regions on the side orientated towards the cathode half cell with a catalyst for the reduction of oxygen, wherein an oxidation zone for the oxidation of ions with negative standard electrode potential is provided between the ion-conducting membranes.

2. The air-breathing fuel cell according to claim 1, wherein ions are contained in the anode half cell, ions selected from the group consisting of V2+, U3+, Ti3+, Ti2+, In2+, In+, Cr2+, Eu2+, S2O62−, S2O42−, S2O3−, H2PO2−, HPO32−, SO32−, BH4−, Sn2+, HsnO2−, AsO2−, SbO2−.

3. The air-breathing fuel cell according to claim 1, wherein an oxidant, oxygen and/or air, is contained in the cathode half cell and/or in the oxidation zone.

4. The air-breathing cell according to claim 1, wherein the anode half cell comprises a carbon plate and a porous carbon material, a graphite felt, the porous carbon material contacting the carbon plate and the first ion-conducting membrane.

5. The air-breathing fuel cell according to claim 1, wherein the cathode half cell comprises a carbon plate and a gas diffusion layer consisting of carbon, the gas diffusion layer consisting of carbon contacting the carbon plate and the second ion-conducting membrane.

6. The air-breathing fuel cell according to claim 1, wherein the oxidation zone comprises
   a) an acidic solution, sulphuric acid and/or phosphoric acid; or
   b) a basic solution, sodium hydroxide solution and/or potassium hydroxide solution; or
   c) a neutral salt solution, sodium chloride and/or potassium chloride.

7. The air-breathing fuel cell according to claim 1, wherein the oxidation zone comprises a porous auxiliary electrode which has a standard electrode potential which enables the oxidation of the ions.

8. The air-breathing fuel cell according to claim 1, wherein the catalyst is selected from the group consisting of noble metals, in particular platinum, ruthenium, palladium and rhodium, and also the alloys thereof.

9. The air-breathing fuel cell according to claim 1, wherein the oxidation zone is connected to a detector via a supply line and discharge line and/or comprises a detector, the detector being suitable for determining the type and concentration of reduction agent in the oxidation zone and is a UV/VIS spectrometer and/or a voltage measuring device.

10. A cell stack made of more than one air-breathing fuel cell according to claim 1.

11. A use of the air-breathing fuel cell according to claim 1 as a battery.

* * * * *